C. FISHER.
SAVINGS BANK.
APPLICATION FILED FEB. 26, 1914.

1,170,525.

Patented Feb. 8, 1916.
5 SHEETS—SHEET 1.

C. FISHER.
SAVINGS BANK.
APPLICATION FILED FEB. 26, 1914.

1,170,525.

Patented Feb. 8, 1916.
5 SHEETS—SHEET 4.

Witnesses:

Inventor:
Charles Fisher
By Dyrenforth, Lee, Chritton & Wiles,
attys.

THE COLUMBIA PLANOGRAPH CO., WASHINGTON, D. C.

C. FISHER.
SAVINGS BANK.
APPLICATION FILED FEB. 26, 1914.

1,170,525.

Patented Feb. 8, 1916.
5 SHEETS—SHEET 5.

Witnesses:

Inventor
Charles Fisher

UNITED STATES PATENT OFFICE.

CHARLES FISHER, OF MILWAUKEE, WISCONSIN, ASSIGNOR TO THE AUTOMATIC RECORDING SAFE COMPANY, OF CHICAGO, ILLINOIS, A CORPORATION OF ILLINOIS.

SAVINGS-BANK.

1,170,525.  Specification of Letters Patent.  Patented Feb. 8, 1916.

Application filed February 26, 1914. Serial No. 821,281.

*To all whom it may concern:*

Be it known that I, CHARLES FISHER, a citizen of the United States, residing at Milwaukee, in the county of Milwaukee and State of Wisconsin, have invented a new and useful Improvement in Savings-Banks, of which the following is a specification.

This invention relates particularly to savings banks which are provided with a plurality of coin chambers adapted to maintain the coins of different denominations in assorted, stacked relation.

In my Patent No. 793,779, granted July 4, 1905, is disclosed a savings bank of the type referred to which has been introduced generally throughout the United States.

The primary object of the present invention is to provide a further novel principle of operation in savings banks, which will greatly facilitate the use of such a device and lessen the labor of the receiving-teller, or bank clerk, whose duty it is to count the money as it is taken from the savings bank, when the savings bank is brought to the banking institution for the purpose of depositing the money therein.

A further important object is to enable a recording safe of small thickness to be produced, primarily for convenience of carrying in the pocket.

The invention is illustrated in its preferred embodiment in the accompanying drawings, in which—

In the preferred embodiment of the invention, the savings bank comprises two vertical complemental sections secured together by a key-controlled lock, one section adapted to contain the coins of the several denominations in assorted, separate piles, and to spread out the coins in overlapped relation in rows, enabling the receiving-teller to count the contents of the savings bank with the greatest facility, and the other section adapted to receive and practically house the first-mentioned section, the second-named section being equipped with a locking-device for securing the sections together and with guarded coin slots corresponding with the several coin-chambers of the first-named section.

Referring to Figs. 1 to 15, inclusive, which show the preferred embodiment of the invention—A represents a vertically-disposed coin-holding section provided with an assorted series of coin-chambers $A'$, $A^2$, $A^3$, $A^4$, and provided further with a central vertical chamber $A^5$ adapted to accommodate a lock-casing; and B represents a complemental vertically-disposed section or housing, which receives the section A and is equipped interiorly with a central vertically-disposed lock-casing B' containing a bolt adapted to lockingly engage the keeper-studs with which the chamber A⁵ is equipped.

In the illustration given, the section B resembles a box placed on edge, and of slightly greater dimensions than the section A and serving as a housing for the section A, which, in turn, has its main vertical walls so proportioned as to serve as a closure for the open side of the casing-section B. The section A has a depending flange 1 which constitutes an extension of the main vertical wall and forms with the lower portion of the casing-section B a sub-chamber 2 adapted to receive bills, access to said chamber being afforded by bill-openings 3 through the lower portions of the vertical flanges of the section B.

Figures 6, 7:
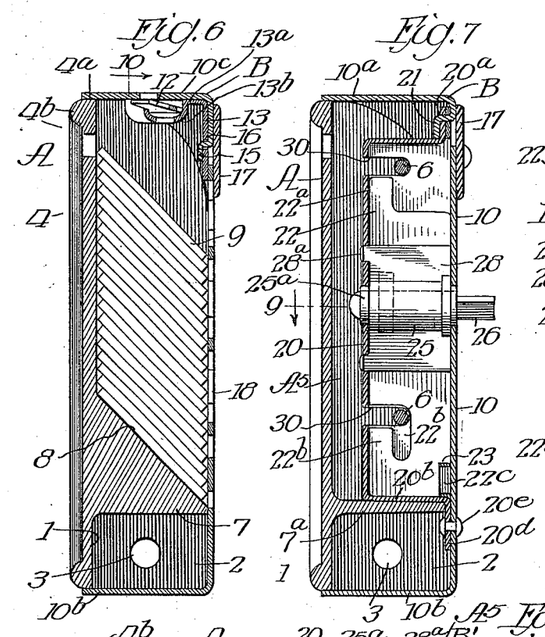
Fig. 6, a vertical sectional view taken as indicated at line 6 of Fig. 1.
Fig. 7, a vertical sectional view taken as indicated at line 7 of Fig. 1, this view showing the locking-mechanism.
Figure 8:
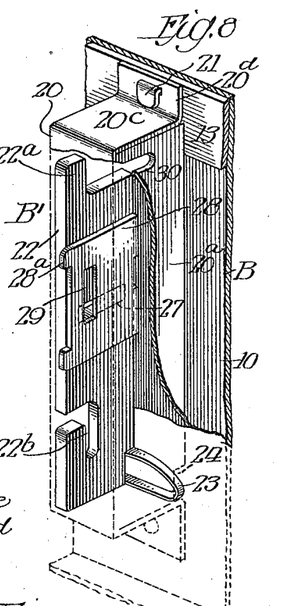
Fig. 8, a broken perspective view, showing the locking-mechanism.
Figure 9:
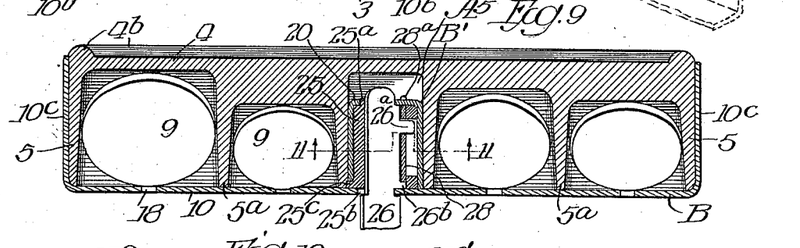
Fig. 9, a horizontal sectional view taken as indicated at line 9 of Fig. 7.

Describing the preferred construction more in detail, the coin-holding section A may comprise a casting having the main vertical wall 4, from which project lateral end walls or flanges 5 and intermediate flanges 5ª suitably spaced to provide the coin-chambers and the lock-casing chamber mentioned. The two central intermediate flanges 5ª which bound the lock-casing chamber A⁵ are connected by horizontal keeper-studs 6 which co-act with the locking-bolt contained in the lock-casing B'. The coin-receptacles are provided with bottom-walls 7 having inclined upper surfaces 8 upon which the coins 9 are adapted to rest in parallel stacked, but inclined relation, as shown in Fig. 6. The bottom walls 7 of the coin-receptacles form, in effect, a horizontal flange uniting the lower ends of the vertical flanges 5 and 5ª, and this bottom flange is continued across the bottom of the chamber A⁵, as indicated at 7ª, but the upper surface of the portion 7ª is not inclined. The horizontal flange which forms the bottom walls of the coin chambers and of the lock-accommodating chamber A⁵ constitutes the upper wall of the bill-chamber 2, as will be understood from Figs. 6 and 7.

From the description thus far given, it will be understood that the coin-chambers are preferably ranged in a common vertical plane, and that means are provided for causing the coins to assume a stacked relation, but with the coins of each stack inclined. The upper ends of the coin-chambers are open, and the upper edge of the vertical wall 4, which is indicated at 4ª, is preferably comparatively thin to facilitate the discharge of the coins upon a table, in the manner illustrated in Fig. 5. The outer surface of the vertical wall 4 is provided with a half-round marginal bead 4ᵇ, which bead is extended also along the margins of the flange or extension 1. The bead 4ᵇ is adapted to rest upon the table or counter when the savings-bank is being opened, and also gives a desirable finish to the savings-bank.

The casing-section B comprises a vertical wall 10, laterally-extending top and bottom walls 10ª and 10ᵇ, and laterally-extending vertical edge walls 10ᶜ. The section B is adapted to receive the section A, the vertical edge-flanges 10ᶜ embracing the flanges 5, the top flange 10ª overlying the upper portion of the section A and the flange 10ᵇ underlying the lower portion of the section A and forming the bottom-wall of the bill-chamber 2. The top wall 10ª is provided with a series of coin-slots 11 corresponding with the several coin-chambers; and said wall 10ª is equipped internally with slot-guards 12. The coin-slots 11 are preferably obliquely disposed with relation to the main vertical wall 10 of the section B, the purpose being to insure the coins dropping into the coin-receptacle in such manner that they will rest in stacked relation on the inclined surfaces 8 of the bottom walls 7. The slot-guards 12 are mounted on a guard-carrying plate 13 disposed adjacent the upper portion of the inner surface of the vertical wall 10. The plate 13 is equipped with a series of arms or brackets 13ª which extend in a horizontal plane toward the open side of the casing-section B and underlie the top wall 10ª. The arms 13ª extend obliquely with relation to the end walls 10ᶜ and are provided with depressed slot-guard bearings 13ᵇ which extend parallel with the coin-slots 11.

Figures 11, 12, 13, 14, 15, 16:
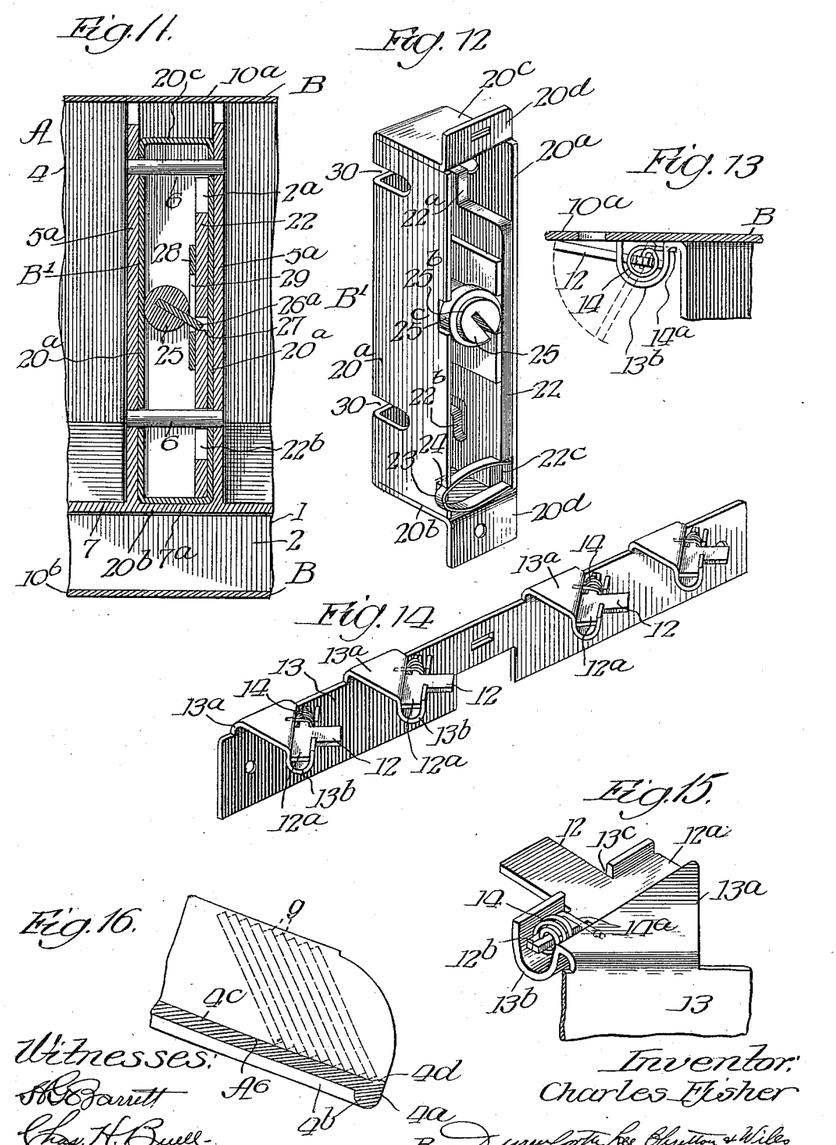
Fig. 11, a broken vertical section taken as indicated at line 11 of Fig. 9.
Fig. 12, an inner perspective view of the lock casing, bolt and key-barrel.
Fig. 13, an enlarged broken section taken as indicated at line 13 of Fig. 3 and showing a detail of the slot-guard employed.
Fig. 14, a broken perspective view showing a slot-guard mounting employed.
Fig. 15, an enlarged broken perspective view showing one of the slot-guards and its mounting.
Fig. 16, a broken sectional view showing a slight modification of the coin-holding section of the savings bank.

The slot-guards 12 are preferably of the pivoted type and may be stamped from sheet metal. They have pivotal portions 12ª resting in the bearings 13ᵇ and confined between said bearings and the top wall 10ª, and have tongue-portions which extend at right angles to the coin-slots 11, the bearings 13ᵇ being provided with slots 13ᶜ through which the tongue-portions of the slot-guards extend. One end of the pivotal part of each slot-guard is provided with a slit 12ᵇ in which is clamped or held the inturned end of a coil spring 14 whose convolutions encircle the trunnion of the slot-guard and whose opposite end 14ª extends through a perforation in one wall of the bearing 13ᵇ, as will be clearly understood from Figs. 13 and 15. The springs 14 tend to hold the tongues of the slot-guards 12 against the inner surface of the top wall 10ª, as shown in Fig. 13. The slot-guards will yield downwardly to admit the coins, and will close to prevent removal of the coins.

The plate or mounting 13 is preferably secured to the upper portion of the main vertical wall 10 by clenching-lugs 15 which are struck inwardly from the wall 10 and pass through slots or perforations 16 with which the plate 13 is provided, the lugs 15 being clenched on the inner surface of the plate 13. A finish or name-plate 17 is applied to the upper portion of the outer surface of the vertical wall 10, and covers the perforations in the wall 10 produced by forming the clenching-lugs 15.

The main vertical wall 10 of the casing-section B is preferably provided with a series of perforations 18, associated with graduations 19. These correspond with the several coin-receptacles, enabling the coins to be viewed and the amount of the contents of the several receptacles indicated. Notwithstanding the fact that the receiving-teller counts the coins when a deposit is made, the depositor is able to know with practical certainty the value of the coins in the savings-bank by noting the registration with the graduations.

It is noted that the several coin-receptacles of the section A are left wide open laterally, the walls 10 of the casing-section B affording a closing-wall for the several receptacles. The leaving of the coin-receptacles laterally open is a matter of preference. It is desirable that one shall be able to view the coins through the perforations 18, and it is more convenient to leave the coin-chambers of the section A wide open to facilitate the manufacture of the device. Again, the stacks of coins can be viewed and removed in any desired manner, as will be understood from Fig. 4; and when the device is to be used in the preferred way illustrated in Fig. 5, in removing the coins, wedging of the coins is obviated, and the receiving-teller is able to watch the operation and secure the best results.

Figure 10:
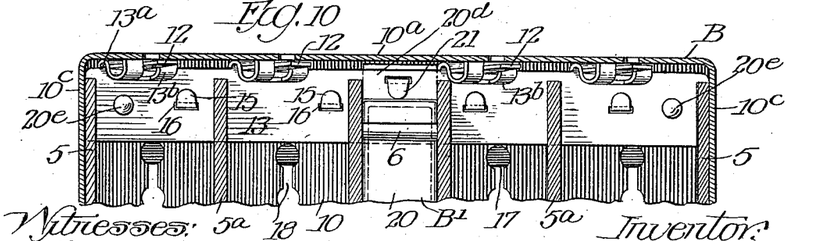
Fig. 10, a broken vertical sectional view taken as indicated at line 10 of Fig. 6, and showing the slot-guards employed.

The lock-casing B' is vertically disposed and may best be described as a box having one long side open and turned to the main wall 10 of the casing-section B. It has the vertical wall 20 parallel with the main wall 10 of the section B, vertical side-walls or flanges $20^a$ parallel with the flanges $10^c$, bottom wall or flange $20^b$ so spaced with relation to the flange $10^b$ that it will pass above the wall $7^a$ of the section A, and a top wall $20^c$ which is disposed slightly below the top wall $10^a$. The end flanges $20^b$ and $20^c$ of the lock-casing are provided with extensions $20^d$ which are turned at right angles to the end flanges. One of the attaching flanges $20^d$ is provided with a perforation which receives a clenching-lug 21 struck inwardly from the wall 10, as shown in Figs. 7 and 10, and the other attaching flange $20^d$ is provided with a perforation which receives a rivet $20^e$ in the manner shown in Fig. 7. It will be understood that Fig. 12 shows the lock as it would appear with the wall 10 of the section B removed. In the form shown, the bolt 22 comprises an elongated plate disposed adjacent one vertical flange $20^a$ of the lock-casing and provided with tongues or projections $22^a$, $22^b$ adapted to engage the locking-studs or keeper-studs, 6, of the section A. The bolt 22 is adapted to be moved to the locking position by a U-spring 23, one extremity of which rests against the lower flange $20^b$ and the other extremity of which engages a shoulder afforded by a notch $22^c$ at the lower end of the bolt. The web-portion of the spring is received freely in a notch 24 with which the adjacent flange $20^a$ of the lock-casing is provided. When the lock-casing is applied to the wall 10 of the section B the spring will be properly confined in position.

Figure 1:
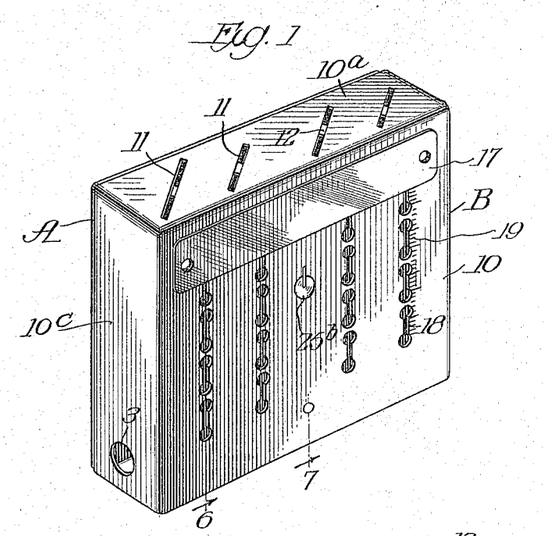
Figure 1 represents a perspective view of a savings bank constructed in accordance with this invention, according to the preferred embodiment.
Figure 2:
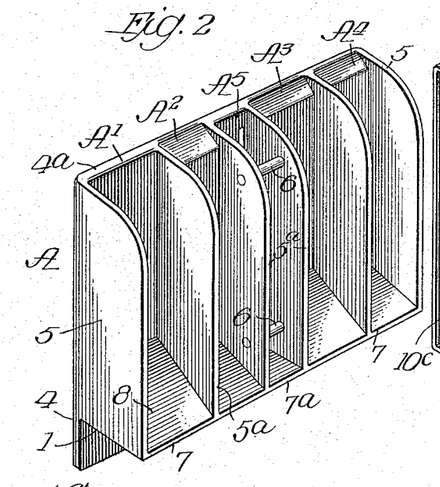
Fig. 2, an inner perspective view of one of the two sections employed in the preferred construction of the device.
Figure 3:
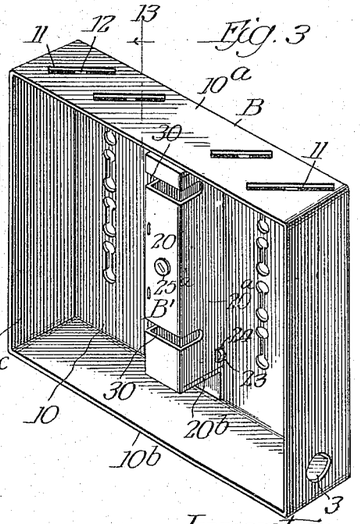
Fig. 3, an inner perspective view of the other complemental section of the device.
Figures 4, 5:
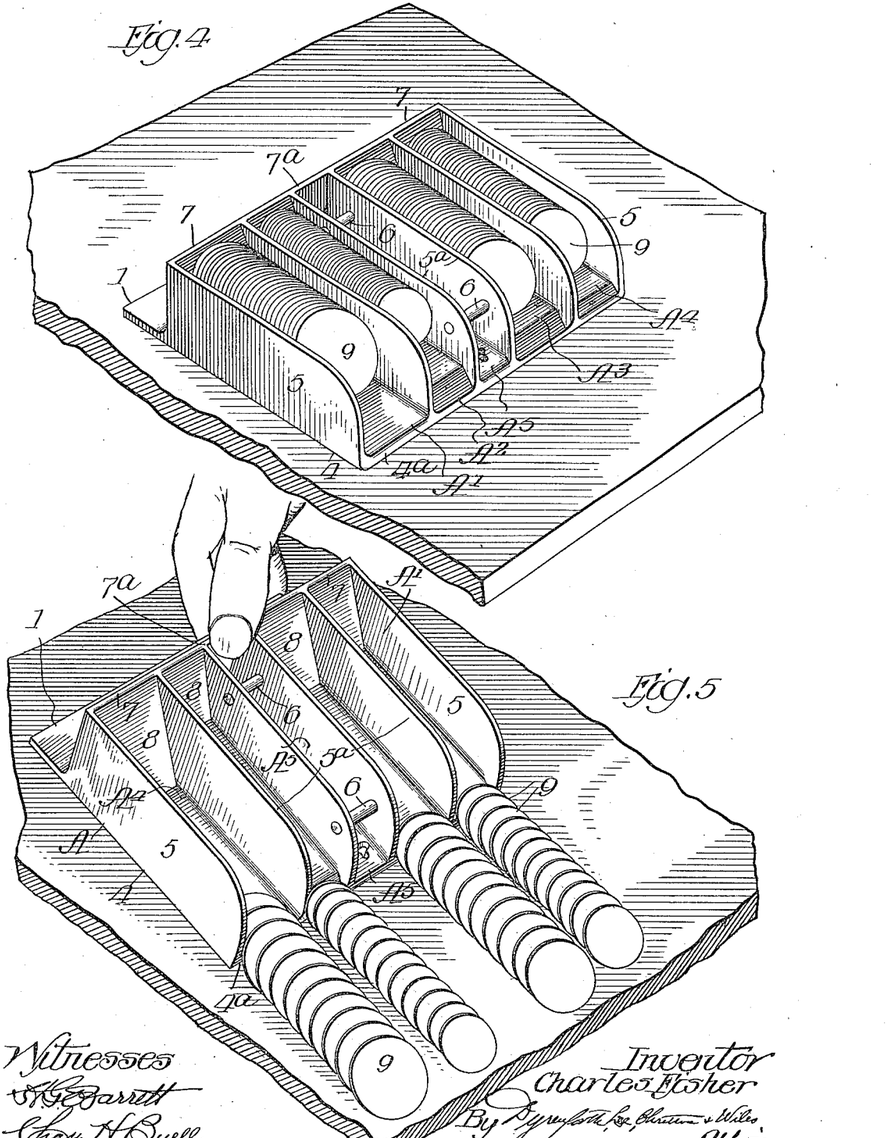
Fig. 4, a perspective view of the coin-assorting and holding section of the device showing the same containing coins, after the removal of the casing-section.
Fig. 5, a perspective view illustrating the manner in which the coins may be spread on the table in assorted, alined rows, ready to be counted by the receiving-teller.

The key-barrel 25 extends perpendicular to the wall 10 of the section B. It has a reduced rear end $25^a$ received in a perforation in the wall 20 of the lock-casing and has a reduced front end $25^b$ received in a perforation with which the wall 10 is provided. The key-barrel also has a flange $25^c$ which bears against the inner surface of the wall 10. The key-barrel and the wall 10 of the section B are suitably slotted, as indicated in Fig. 1, to admit the key 26. The key 26 has its bit-portion provided with a lateral projection $26^a$ adapted to actuate the bolt; and the key-bit is further provided with a flange $26^b$ which works inside of the wall 10 and prevents withdrawal of the key, except when it registers with the slot in the wall 10, which is illustrated in Fig. 1.

The bar-form bolt 22 is provided with a horizontal slot or perforation 27 adapted to be engaged by the lateral projection $26^a$ of the key-bit. Interposed between the bolt 22 and the key-barrel is a fixedly-secured change-plate 28 which is provided with a vertical slot or perforation 29 which extends crosswise of the slot 27. The projection $26^a$ of the key registers with the slot 29, extends through the same, and engages the slot 27 of the bolt. The change-member 28 is preferably secured to the rear wall 20 of the lock-casing by clenching-lugs $28^a$. It will now be understood that the vertical slot 29 of the change-plate 28 may be disposed at any desired distance from the front wall 10 of the section B and that the bolt-actuating member $26^a$ of the key may be disposed on the key to correspond with the location of the slot 29. By providing interchangeable change-plates 28 having differently positioned vertical slots 29, cheap provision is made for changing the keys at will.

The rear wall 20 and the side walls $20^a$ of the lock-casing are provided with slots 30 adapted to register with the keeper-studs 6 when the sections of the device are brought together, as can be done when the bolt 22 is retracted by the key, as will be understood from Fig. 7. After the sections are brought together, the key may be turned to the entering and removing position, the key may be removed, and the spring will serve to hold the bolt in the locking position.

The preferred manner of using the preferred construction of the device is as follows: Assuming that the section A has been locked within the section B and the key retained by the banking institution, the depositor fills the savings-bank by inserting coins through the slots 11, the guards 12 yielding to admit the coins, and such bills as are to be deposited are inserted into the bill-compartment 2 through the bill-opening 3. The depositor then takes the savings-bank to the banking institution, where the key is retained. The receiving-teller lays the savings-bank on the counter, where it rests upon the section A, inserts the key, unlocks the device, and lifts off the casing-section B. The teller then grasps the lower portion of the section A which is conveniently turned away from him, elevates the same, leaving the top edge $4^a$ resting on the counter, and effects a discharge of the coins, leaving the coins of different denominations ranged in assorted rows with the coins partially overlapping each other, in the manner shown in Fig. 5. In this position the rows of coins may be counted with great facility, the teller snapping the coins up one by one in the counting operation. In emptying the coins, the section A may be conveniently grasped between the thumb and fingers, the thumb engaging the flange $7^a$, while the fingers engage the flange 1, in the manner illustrated in Fig. 5. The knack of handling the device so as to insure the discharge of the coins of different denominations in proper alinement and partially overlapping relation is readily acquired. If preferred, for any reason, the coins may be taken out in stacks, as will be evident from Fig. 4. In the form shown, this may be accomplished by lateral removal of the stacks of coins, or by longitudinal movement through the coin-chambers. Again, if desired, the coins may be "told off", one by one, from each compartment. I would emphasize the fact that, regardless of the manner of removing and counting the coins, the device serves effectively to keep the denominations separate till counting can be effected in a facile manner.

In Fig. 16 is illustrated a slight modification of a coin-chamber $A^6$. Here, the wall $4^c$, which corresponds with the wall 4, is provided, near its free upper edge, with a slight internal bead $4^d$ which is just of sufficient height to prevent accidental "spilling" of the coins when the casing-section B is removed, but which will not interfere with the discharge of the coins when the section is tilted and withdrawn in the manner shown in Fig. 5.

Figures 17, 18, 19, 20, 21, 22:
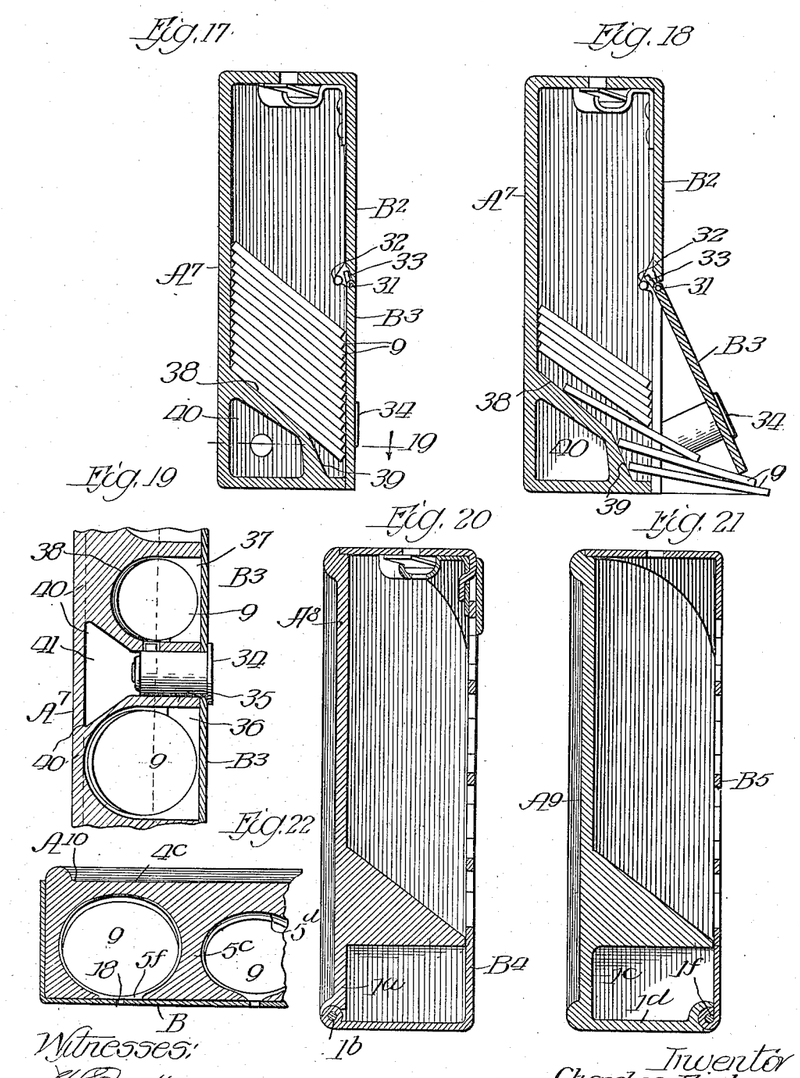
Fig. 17, a broken vertical sectional view showing a modification of the invention.
Fig. 18, a similar broken sectional view showing the closure of the modified form in open position.
Fig. 19, a broken horizontal section illustrating a lock employed in connection with the closure shown in Figs. 17 and 18.
Figs. 20, 21 and 22, sectional views, showing other modifications.

In the modification illustrated in Figs. 17, 18 and 19, the coin-holding section $A^7$ and the casing-section $B^2$ are shown permanently connected, but the portion $B^2$ is provided with a closure $B^3$ which comprises the lower portion of the front of the device. The closure $B^3$ is connected by a pivot 31 and is provided with a stop 32 adapted to engage a stop 33 which limits the outward swing of the closure. The closure is fitted with a simple lock-device 34 adapted to interlockingly engage one of the walls of the lock-accommodating chamber 35 which is disposed between two of the coin-chambers 36 and 37. The coin-chambers have sloping bottom walls 38 which are cut away or recessed at the lower front corners, as indicated at 39; and a bill-chamber 40 is cored out of the bottom wall 38, access to the bill-chamber being had, when the savings-bank is open, through a central opening 41 communicating with the lock-accommodating chamber 35. When the savings-bank is opened, after first being filled with coins, the coins will slide out and become ranged in rows on the counter, in the manner illustrated in Fig. 18. By cutting away the sloping walls 38 at their front portions, as indicated at 39, the rear edge of the lowermost coin is permitted to drop some time before the coin wholly escapes from the savings-bank, so that another coin can settle down and start through the discharge-opening, so that the overlapping relation of the coins can be maintained in the discharging operation.

In the modification shown in Fig. 20, the coin-holding section is designated $A^8$, and the complemental casing-section is designated $B^4$. In this instance, the base-portion of the casing-section is hinged to the flange $1^a$, as indicated at $1^b$. Otherwise, the construction is the same as shown in Figs. 1–15.

In the modification shown in Fig. 21, $A^9$ represents the coin-holding section, and $B^5$ the closure. In this case, the flange $1^c$ carries the base-flange $1^d$, and the closure, or complemental casing-section $B^5$ is connected by a pivot $1^f$ to the flange $1^d$.

In the modification shown in broken horizontal sections in Fig. 22, the construction is like that shown in Figs. 1–15, except that the coin-holding section $A^{10}$ has its main vertical wall $4^e$ equipped with lateral flanges $5^c$ so shaped as to afford coin-chambers $5^d$ of oval cross-section. These coin-chambers, besides being open at their upper ends, have vertical openings or slots $5^f$ at their front sides through which the coins can be viewed, since the openings $5^f$ register with the view-openings 18 of the casing-section B. The coins will slide out of the open upper end of the section $A^{10}$ when the section $A^{10}$ is to be emptied in the manner shown in Fig. 5.

In each form of the device, means are provided for insuring stacked relation of the coins of each denomination, but with the coins tilted or inclined with respect to the axis of the coin-stack, to facilitate the discharge of the coins in proper alinement and preferably in partially overlapped relation. It is desirable that the coins shall drop freely into the coin-chambers, in filling the savings-bank; and it is likewise desirable that the coins shall be capable of being freely discharged or removed, but without confusion or jumbling of the coins, a very important consideration being to provide a savings-bank which will actually keep the coins assorted in a practical manner until they can be counted by the receiving-teller of the banking institution. The walls of the coin-compartments are rigid, and while they suffice to guide and stack the coins, and keep the stacks separate, they do not clasp or bind the coins, but permit the greatest freedom of insertion and removal of the coins.

So far as the principle of discharging the coins in assorted, alined relation is concerned, this may be accomplished in various ways, and the details illustrated are not to be regarded as indispensable. It is important, however, that the series of coin-chambers be ranged in a common plane, or very near thereto, when the device is to be emptied in the manner shown in Fig. 5; and it is preferred to provide the savings-bank with means for normally holding the coins in inclined position, as such an expedient facilitates the discharging of the coins in rows and enables an overlapping relation to be secured, which greatly facilitates the counting. It is to be observed, however, that the coins might be discharged in rows without securing the partially overlapping relation, and good results would nevertheless be obtained.

The foregoing detailed description has been given for clearness of understanding only, and no unnecessary limitation should be understood therefrom, but the appended claims should be construed as broadly as permissible in view of the prior art.

What I regard as new and desire to secure by Letters Patent is—

1. A savings-bank comprising a series of coin-compartments adapted to maintain the coins in assorted, stacked relation, and a closure releasably locked in closed position, said savings-bank having coin-admission slots corresponding with the coin-compartments and having said coin-compartments so formed arranged and alined as to permit the several stacks of coins to be spread out in rows by manipulating the savings-bank.

2. In a savings-bank, the combination of a section having a series of coin-compartments, so formed, arranged and alined as to permit the several stacks of coins to be spread out in rows by manipulating the savings-bank, a complemental casing-section, means associated with said first-named section whereby the coins will be stacked with the individual coins inclined, and coin-admission ports corresponding with the several coin-compartments.

3. In a savings-bank, the combination of a section having a series of coin-compartments disposed substantially in a common plane, a complemental casing-section, a releasable locking-device securing said sections together, and coin-admission ports corresponding with the several coin-compartments, said first-named section having its coin-compartments of such form, construction and arrangement as to adapt the device to be manipulated to discharge the coins in rows on a table.

4. A savings-bank comprising a series of coin-compartments having means for stacking the coins with the coins inclined with relation to the axes of the stacks, said compartments being so formed, arranged and alined as to permit the several stacks of coins to be spread out in rows by manipulating the savings-bank, and a closure releasably locked in closed position, said savings-bank having coin-admission slots corresponding with the coin-compartments and equipped with slot-guards.

5. A savings-bank comprising a series of coin-compartments for coins of different denominations, said compartments having sloping walls at their bottoms, and a closure releasably locked in closed position, said savings-bank having coin-admission slots corresponding with the coin-compartments.

6. A savings-bank comprising a series of coin-compartments arranged substantially in a common plane and having sloping bottom walls, and a top wall disposed above said compartments and provided with obliquely-disposed coin-slots corresponding with the several compartments.

7. In a savings-bank, the combination of two vertically-disposed, complemental sections, one having a series of coin-compartments disposed in substantially the same vertical plane, a releasable locking-device connecting said sections together, and guard-controlled coin-slots corresponding with the several coin-compartments, the section having the coin-compartments being adapted to be manipulated to discharge the coins in rows upon a table.

8. In a savings-bank, the combination of two vertically-disposed complemental sections, one having a series of coin-compartments having their bottom walls provided with inclined surfaces, means for releasably locking said sections together, and a series of guard-equipped coin-slots corresponding with the several coin-compartments.

9. In a savings-bank, the combination of two vertically-disposed complemental sections, one having a series of coin-compartments provided with bottom walls having inclined surfaces, means releasably locking said sections together, and obliquely-positioned coin-slots corresponding with the several coin-compartments.

10. In a savings-bank, the combination of a vertically-disposed section having a series of vertical coin-compartments provided with inclined bottom-walls and having open upper ends, said compartments being so formed, arranged and alined as to permit the several stacks of coins to be spread out in rows by manipulating the savings-bank, and a lock-controlled closure-device having a series of coin-slots corresponding with the several coin-compartments.

11. In a savings-bank, a section equipped with a locking member and adapted to be locked to a complemental casing-section, having an outer vertical wall and differently spaced walls connected therewith and forming a series of vertical compartments for coins of different denominations, said compartments provided with inclined bottom walls and having open upper ends, for the purpose set forth.

12. In a savings-bank, the combination of a section comprising a vertical wall and lateral vertical flanges joined thereto and forming therewith a series of vertical coin-compartments, said compartments having sloping bottom walls and being adapted to maintain the coins inclined with relation to the axes of the coin-stacks and adapted to spread the several stacks of coins out in rows by manipulation of said section, and a casing-section releasably locked to said first-named section.

13. In a savings-bank, the combination of a section comprising a vertical wall and lateral vertical flanges joined thereto and forming therewith a series of vertical coin-compartments, said compartments having sloping bottom walls and adapted to maintain the coins inclined with relation to the axes of the coin-stacks, and a complemental vertical casing-section receiving said first-named section and releasably locked thereto.

14. In a savings-bank, the combination of a section comprising a vertical wall and lateral vertical flanges joined thereto and forming therewith a series of vertical coin-compartments, said compartments having sloping bottom walls and adapted to maintain the coins in inclined position and assorted, stacked relation, and a complemental vertical casing-section receiving said first-named section and releasably locked thereto, said casing-section having a top wall provided with coin-admission slots corresponding with the several coin-compartments.

15. In a savings-bank, the combination of a vertical casing-section having an open side, a complemental section received therein and comprising a substantially plane vertical wall equipped at its inner side with a series of coin-compartments which have openings at their upper ends and at their sides which lie adjacent the main vertical wall of the casing-section, means releasably locking said sections together, and a series of coin-slots corresponding with the several coin-compartments.

16. In a savings-bank, the combination of a vertical casing-section having an open side, a complemental section received therein and comprising a substantially plane vertical wall equipped at its inner side with a series of coin-compartments which lie adjacent the main vertical wall of the casing-section, means releasably locking said sections together, a series of coin-compartments which have openings at their upper ends and at their sides which lie adjacent the main vertical wall of the casing-section, and means releasably locking said sections together, the casing-section having a top wall overlying the coin-chambers and provided with a series of guard equipped coin-admission slots.

17. In a savings-bank, the combination of a casing-section comprising a main vertical wall, lateral vertical edge flanges and lateral top and bottom flanges extending therefrom, a vertically-disposed lock-casing secured to said main vertical wall and equipped with a key-controlled bolt, and a complemental section comprising a main vertical wall and flanges projecting laterally therefrom and affording a series of vertical coin-compartments and a lock-accommodating compartment equipped with means adapted to be engaged by said bolt, and a series of coin-slots corresponding with the several coin-compartments.

18. In a savings-bank, the combination of a casing-section comprising a main vertical wall and vertical edge-flanges and horizontal top and bottom flanges projecting therefrom, and a complemental section received in said casing-section, comprising a main vertical wall equipped on the inner side with a series of vertical coin-compartments, said coin-compartments having bottom walls spaced above the bottom flange of the casing and forming therewith a sub-chamber, means releasably locking said sections together, and admission-openings corresponding with the several coin-compartments and sub-chamber.

19. In a savings-bank, the combination of a casing-section comprising a main vertical wall provided with several vertical series of openings, vertical edge-flanges and top and bottom flanges projecting laterally from said wall, a complemental section received in said casing-section and comprising a main vertical wall and vertical flanges projecting inwardly therefrom at right angles thereto, and bottom flanges at the lower ends of said first-named flanges, thus affording a series of vertical coin-compartments open at their upper ends and open at their sides adjacent the main vertical wall of the casing-section, means releasably locking said sections together, and coin-slots corresponding with the several coin-compartments.

20. In a savings-bank, the combination of a casing-section comprising a main vertical wall and flanges projecting laterally therefrom, a lock projecting inwardly from said main vertical wall, and a complemental section comprising a main vertical wall having on one side thereof a series of vertical coin-compartments, and a lock-accommodating chamber equipped with bolt-engaging means, and coin-slots corresponding with several coin-compartments.

21. A savings-bank comprising a series of coin-compartments having inclined bottom walls and adapted to maintain the coins in inclined position and in assorted, stacked relation, said coin-compartments having open upper ends, a closure, and a series of obliquely-disposed coin-admission slots positioned above the upper ends of the several coin-compartments.

22. A savings-bank comprising a series of coin-compartments having inclined bottom walls and adapted to maintain the coins in inclined position and in assorted, stacked relation, said coin-compartments having open upper ends, a closure, a series of obliquely-disposed coin-admission slots positioned above the upper ends of the several coin-compartments, and a series of obliquely-disposed slot-guards beneath the coin-slots.

23. In a savings-bank, the combination of two complemental vertical members forming a thin structure adapted to stand on edge, said members being separable along a vertical plane and affording the outer side walls of the structure, one of said members provided with vertical coin-receptacles which are open at their upper ends and which have vertical openings adjacent the side wall of the other member and the other member having a laterally projecting top-flange provided with coin-admission slots corresponding with said coin-receptacles, and locking means securing said members together.

24. In a savings-bank, the combination of a vertical section provided with a series of vertical coin-compartments arranged in a common plane and having admission-openings at their upper ends and provided with sloping bottom walls, a co-acting vertical casing-section having a top flange projecting over said coin-compartments and provided with a series of coin-slots, a slot-guard mounting secured to the vertical wall of said casing-section and equipped at its upper edge with a series of bearings disposed beneath said top flange, and a series of slot-guards mounted in said bearings.

25. In a savings-bank, the combination of a casing-section provided with a lock-casing, a key-barrel in said lock-casing, a bolt in said lock-casing provided with key-engaging means, and a change-plate interposed between said bolt and key-barrel and provided with a slot through which the lateral projection of the key must extend to engage the bolt; and a coin-holding section co-acting with said casing-section and provided with a series of coin-compartments and provided also with means adapted to be engaged by said bolt.

26. In a savings-bank, the combination of a section comprising a vertical wall and lateral flanges projecting therefrom and forming therewith a series of coin-chambers which have admission openings at their upper ends, a casing-section comprising a main vertical wall and a top wall projecting therefrom and disposed above said coin-compartments, said top wall having a series of obliquely-disposed coin-slots therein, a guard-mounting secured to the main vertical wall of said casing at the upper portion thereof and equipped with a series of obliquely-disposed bearings located beneath said top wall, and a series of spring-held slot-guards having obliquely-disposed pivot portions received by said bearings and having tongue-portions extending crosswise of said coin-slots.

27. A savings-bank comprising a key-controlled closure, and a coin-holding device locked thereto and comprising a body having a series of coin-receptacles with lateral openings at one side and said coin-receptacles adapted to receive the coins freely, said coin-receptacles ranged in substantially a common plane, and said coin-holding device forming one outer wall of the savings bank and adapted to lie on one side and maintain the coins of different denominations in rows when the closure is open, said savings-bank having coin-admission ports corresponding with the coin-compartments.

28. A savings-bank comprising a series of substantially rigid coin-receptacles for coins of different denominations and arranged in substantially a common plane and forming a single body which affords an outer wall of the savings-bank and having associated therewith means for so stacking the coins that they are inclined with relation to the axes of the coin-stacks, a lock-controlled closure, and coin-admission means for the several coin-compartments.

29. A savings-bank comprising a closure, and a coin-holding device locked thereto and affording an outer wall of the savings-bank and comprising a body having a series of open-sided, open-topped coin-receptacles adapted to receive the coins freely, said coin-receptacles ranged in substantially a common plane and having inclined bottom walls, and said coin-holding device adapted to lie on one side and maintain the coins of different denominations in rows when the closure is open, said savings-bank having coin-admission ports corresponding with the coin-compartments.

30. A savings-bank comprising a series of open-sided, open-topped coin-receptacles arranged in substantially a common plane and forming a single body which affords a side for the savings-bank, said coin-receptacles having means at their bottom for so stacking the coins that they are inclined with relation to the axes of the coin-stacks, a lock-controlled closure, and coin-admission means for the several coin-compartments.

31. In a savings-bank, a coin-holding section comprising an outer vertical wall and flanges projecting from one side thereof and forming therewith open-sided, open-topped coin-receptacles, inclined bottom walls for said coin-receptacles, and a locking-member, whereby said section may be releasably locked to a companion casing-section.

32. A savings-bank comprising a series of coin-compartments, adapted to maintain the coins in assorted, stacked relation, means associated with the lower portions of said coin-compartments for inclining the coins with respect to the axes of the coin-stacks, said savings-bank having coin-admission slots corresponding with the coin-compartments and having said coin-compartments so formed, arranged and alined as to permit the several stacks of coins to be spread out in overlapped relation in rows by manipulating the savings-bank.

33. A savings-bank comprising an outer vertical wall having its inner side provided with a series of different sized vertical coin-receptacles which have vertical openings at the side opposite said vertical wall, casing means, including a lock-controlled closure, said casing means affording an outer vertical wall adjacent said continuous vertical openings and provided with vertical rows of sight-openings corresponding therewith, and coin-admission means for the several coin-receptacles.

CHARLES FISHER.

In the presence of—
O. C. AVISUS,
D. C. THORSEN.

Copies of this patent may be obtained for five cents each, by addressing the "Commissioner of Patents, Washington, D. C."